United States Patent
Takenoiri et al.

(10) Patent No.: US 7,781,080 B2
(45) Date of Patent: Aug. 24, 2010

(54) PERPENDICULAR MAGNETIC RECORDING MEDIUM

(75) Inventors: Shunji Takenoiri, Matsumoto (JP); Yasushi Sakai, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 362 days.

(21) Appl. No.: 11/896,486

(22) Filed: Aug. 31, 2007

(65) Prior Publication Data
US 2008/0062583 A1    Mar. 13, 2008

(30) Foreign Application Priority Data
Sep. 13, 2006 (JP) ............... 2006-248628

(51) Int. Cl.
G11B 5/667 (2006.01)
(52) U.S. Cl. ................. 428/828; 428/828.1
(58) Field of Classification Search .......... None
See application file for complete search history.

(56) References Cited

U.S. PATENT DOCUMENTS

| | | | |
|---|---|---|---|
| 7,588,842 B1 * | 9/2009 | Abarra et al. ............ 428/828.1 |
| 2002/0098380 A1 | 7/2002 | Platt | |
| 2003/0022023 A1 | 1/2003 | Carey et al. | |
| 2006/0001996 A1 | 1/2006 | Aoyagi et al. | |
| 2006/0147758 A1 * | 7/2006 | Jung et al. ............... 428/828.1 |
| 2007/0230052 A1 * | 10/2007 | Ajan et al. ................ 360/131 |

FOREIGN PATENT DOCUMENTS

| | | |
|---|---|---|
| CN | 1734565 A | 2/2006 |
| JP | 06-103553 | 4/1994 |
| JP | 07-129946 | 5/1995 |
| JP | 2001-155321 | 6/2001 |
| JP | 2002-170216 | 6/2002 |

OTHER PUBLICATIONS

Maat, S. et al., "Ultrathin CoPt-pinned current perpendicular to plane spin valves", 20051213, XP012077940, ISSN 0021-8979, vol. 98, No. 11, p. 113907-1-113907-4, Journal of Applied Physics, American Institute of Physics, NY, US.

(Continued)

*Primary Examiner*—Kevin M Bernatz
(74) *Attorney, Agent, or Firm*—Rabin & Berdo, P.C.

(57) ABSTRACT

A perpendicular magnetic recording medium composed of a nonmagnetic substrate having a surface onto which are provided a plurality of layers including, in the order recited, a soft underlayer; a nonmagnetic coupling layer; a hard magnetic pinning layer which is antiferromagnetically coupled to the soft underlayer at ambient temperature via the nonmagnetic coupling layer and which has an axis of easy magnetization which extends in a direction which is perpendicular to that of the surface of the nonmagnetic substrate; a nonmagnetic intermediate layer; and a magnetic recording layer. Such a perpendicular magnetic recording medium has an improved medium performance, with reduced noise originating from the presence of the soft underlayer, and no erasure of recorded magnetization when influenced by an external magnetic field.

20 Claims, 6 Drawing Sheets

OTHER PUBLICATIONS

Hashimoto, A. et al., "Single-domain and control of magnetic anisotropy of soft magnetic underlayer for perpendicular recording media using interlayer exchange coupling", ISSN 0385-7719, vol. 73, No. 1, pp. 373-374, Dec. 2004, Electrical and Communication Engineering Conversazione, Tohoku University, Japan.

Takenoiri, S. et al., "Exchange-Coupled IrMn/CoZrNb Soft Underlayers for Perpendicular Recording Media", XP0011315534, 7450887 INSPEC E2002527290947 Compendex, ISSN 0018-9464, vol. 38, No. 5, Transactions on Magnetics, 20020901, IEEE Service Center, New York, NY, USA.

Y. Nakatani et al., "Effect of anisotropy field of soft magnetic underlayer on read/write properties in perpendicular recording media," J. Appl. Phys., vol. 93, pp. 7744-7746, May 15, 2003.

A. Chekanov, E. N. Abarra, and G. Choe, "Reduction of Write Pole-Tip Erasure in Perpendicular Magnetic Recording by Track Magnetization State and Media Design," Digests of the INTER MAG 2005, CB11, p. 255 (2005).

K. W. Wierman et al., "Noise Characteristics in Exchange-Biased Soft Underlayers for Perpendicuclar Media," IEEE Transactions on Magnetics, vol. 37, No. 6, pp. 3956-3959, Nov. 2001.

* cited by examiner

PERPENDICULAR MAGNETIC RECORDING MEDIUM

BACKGROUND OF THE INVENTION

1. Field of the Invention

The present invention relates to a perpendicular magnetic recording medium to be installed in any of various magnetic recording apparatuses.

2. Description of the Related Art

Since 1997, the recording density of hard disk drives (HDDs) has increased rapidly at a rate of 60 to 100% per year. As a result of this remarkable growth, a limit is being approached for increasing the recording density with hitherto used longitudinal recording. Due to this state of affairs, in recent years, a perpendicular recording method for which the recording density can be increased has come to receive attention, and research and development have been carried out with vigor. In 2005, commercialization of HDDs using the perpendicular recording method finally started for some HDD models.

A perpendicular magnetic recording medium comprises a magnetic recording layer made of a hard magnetic material, and an underlayer made of a soft magnetic material that fulfils the role of concentrating magnetic flux produced by a magnetic head used when recording onto the recording layer. Of these layers, the soft underlayer is sometimes regarded as part of the head, and is an essential component for maintaining good writeability for the perpendicular magnetic recording medium.

However, problems with use of the soft underlayer have been identified including (1) to (3) which follow. (1) Noise known as spike noise results when magnetic domain walls form in the soft underlayer arises. (2) Noise additionally results due to the mirror-image of the magnetic recording layer being transferred to the soft underlayer. (3) Recorded magnetization may be lost if a stray magnetic field in the HDD or a magnetic field produced by the mirror-image written onto the magnetic recording layer forms a magnetic circuit with the soft underlayer via the head.

To suppress problem (1), hitherto there have been proposed, for example, a method in which a hard magnetic pinning layer is provided between the soft underlayer and the substrate, so as to orient the magnetization of the soft underlayer in one direction (see Japanese Patent Application Laid-open No. 7-129946), a method in which the magnetization is pinned by utilizing exchange coupling between the soft underlayer and an antiferromagnetic layer (see Japanese Patent Application Laid-open No. 6-103553), and a method in which two soft underlayers are provided and are antiferromagnetically coupled together (see Japanese Patent Application Laid-open No. 2001-155321).

However, with pinning using a hard magnetic pinning layer, it is very difficult to orient the magnetization of the soft underlayer in a specified direction (e.g., an outward radial direction) over the whole disk, and it is known that in actual practice spike noise caused by magnetic domain walls arises at inside and outside diameters. Moreover, to obtain a sufficient exchange coupling field with the method using an antiferromagnetic layer, a complicated and costly method has had to be used, for example, a heat treatment taking from several minutes to several hours must be carried out after film formation, or a multilayer lamination of soft magnetic layers and antiferromagnetic layers must be formed (see K. W. Wierman, et al., IEEE Trans. Magn., Vol. 37, No. 6, pp. 3956-3959, 2001). With the method utilizing two soft magnetic layers which are antiferromagnetically coupled together, a multidomain structure is formed in practice, and hence it has been found that spike noise arises, albeit only to a small extent.

Moreover, for problems (2) and (3), the current state of affairs is that these are regarded as problems, but thorough countermeasures have not been found as yet.

It is an object of the present invention to realize an improvement in medium performance by simultaneously resolving the following three problems for the soft underlayer: (1) the problem of noise known as spike noise caused by magnetic domain walls arising, (2) the problem of noise arising due to the mirror image of the magnetic recording layer being transferred, and (3) the problem of a stray magnetic field in the HDD or a magnetic field produced by magnetization written onto the magnetic recording layer forming a magnetic circuit with the soft underlayer via the head, whereby the recorded magnetization is lost.

To resolve these problems caused by the soft underlayer, the underlying mechanisms thereof must be considered.

For problem (1), it has been known for a long time that this is caused by magnetic domain walls formed in the soft underlayer, and various counter-measures have been devised as described above.

Problem (2) will be explained using a diagram. FIG. 1 consists of schematic views of the magnetization (shown by arrows in the diagram) of a magnetic recording layer 106 and a soft underlayer 102 (an upper portion only being visible in this view) of a conventional perpendicular magnetic recording medium. FIG. 1A shows the case of low-density recording. FIG. 1B shows the case of high-density recording. Note that for simplicity, only the magnetic recording layer and the soft underlayer are shown in FIG. 1, a nonmagnetic intermediate layer and so on being omitted. As shown in FIGS. 1A and 1B, the magnetization of the magnetic recording layer 106 is transferred to the soft underlayer 102. As shown for the case of low recording density in FIG. 1A, noise is caused merely through the magnetization of the soft underlayer 102 being oriented in a perpendicular direction. In addition, the recording resolution for the soft underlayer 102 is low, and hence for high-density recording as shown in FIG. 1B, the direction of the magnetization of the magnetic recording layer 106 and the direction of the magnetization of the soft underlayer 102 do not necessarily coincide, and hence noise is further increased. This is the mechanism by which noise arises for problem (2).

For problem (3), the problem that a stray magnetic field in the HDD may be concentrated in the head is known as an antenna effect. Moreover, a phenomenon in which magnetic flux produced by the magnetic recording layer is concentrated in a return yoke (or a trailing shield) of the head and this returns and erases the recorded data on the medium on the write pole side is known to be one cause of pole erasure (PE) (see A. Chekanov, E. N. Abarra, and G. Choe, Digests of the INTERMAG 2005, CB11, p. 255 (2005)). For the antenna effect and PE, improvements have been attempted predominantly on the head side, but the current state of affairs is that methods for improvement on the recording medium side have rarely if ever been proposed.

All of these problems occur due to the magnetization of an upper portion of the soft underlayer (the portion near the magnetic recording layer) being oriented in a perpendicular direction relative to the surface of the nonmagnetic substrate. It is thought that this phenomenon can be resolved by strongly orienting the magnetization of the soft underlayer in-plane, that is, parallel to the surface of the nonmagnetic substrate. However, if the magnetization is strongly oriented in-plane, then the effect of the soft underlayer drawing in the recording magnetic field produced by the head is weakened, and hence writeability suffers. It is thus thought that the state of "acting as a soft underlayer during recording, but the magnetization of an upper portion of the soft underlayer appearing to disappear during reading" is ideal, but such a structure has not previously been realized.

SUMMARY OF THE INVENTION

In view of the above state of affairs, the present inventors carried out assiduous studies and, as a result, accomplished the present invention upon resolving all of the above three problems for the soft underlayer by providing a hard magnetic pinning layer having anisotropy perpendicular to the surface of the nonmagnetic substrate on an upper portion of the soft magnetic layer, i.e., the side of the soft magnetic layer opposite to the nonmagnetic substrate, with a nonmagnetic coupling layer there between, and antiferromagnetically coupling the hard magnetic pinning layer and the soft underlayer together.

A perpendicular magnetic recording medium of the present invention has a nonmagnetic substrate and a plurality of layers including a soft underlayer, a nonmagnetic coupling layer, a hard magnetic pinning layer, a nonmagnetic intermediate layer, and a magnetic recording layer, in this order, wherein the soft underlayer and the hard magnetic pinning layer are antiferromagnetically coupled together at ordinary temperature. i.e., ambient temperature, via the nonmagnetic coupling layer, and an axis of easy magnetization of the hard magnetic pinning layer is perpendicular to a surface of the nonmagnetic substrate. Here, the soft underlayer may have uniaxial magnetic anisotropy that is parallel to the surface of the nonmagnetic substrate and extends in a radial direction. Moreover, the nonmagnetic coupling layer may be formed from a metal selected from the group consisting of V, Cr, Cu, Nb, Mo, Ru, Rh, Ta, W, Re and Ir, or an alloy having such a metal as a main component thereof. Preferably, the nonmagnetic coupling layer has a thickness of not more than 2 nm. Meanwhile, the hard magnetic pinning layer may be formed from a material having Co as a main constituent thereof and further containing at least one metal selected from the group consisting of Cr and Pt, or a material having a granular structure in which magnetic crystal grains are dispersed in a nonmagnetic oxide or nonmagnetic nitride matrix. The hard magnetic pinning layer preferably has a thickness of not more than 10 nm, and/or a uniaxial anisotropy constant of not less than $5\times10^5$ erg/cm$^3$ ($5\times10^4$ J/m$^3$), and a lower coercivity than the magnetic recording layer. Furthermore, the magnetic recording layer preferably comprises a material having a granular structure in which magnetic crystal grains are dispersed in a nonmagnetic oxide or nonmagnetic nitride matrix.

As described above, by providing a hard magnetic pinning layer having anisotropy perpendicular to a surface of a nonmagnetic substrate on an upper portion of a soft underlayer (the side of the soft underlayer opposite the nonmagnetic substrate) with a nonmagnetic coupling layer there between, and antiferromagnetically coupling the hard magnetic pinning layer and the soft underlayer together, there can be simultaneously resolved the three problems for the soft underlayer: (1) the problem of noise known as spike noise caused by magnetic domain walls arising, (2) the problem of noise arising due to the mirror-image of the magnetic recording layer being transferred, and (3) the problem of a stray magnetic field in the HDD or a magnetic field produced by the mirror-image written onto the magnetic recording layer forming a magnetic circuit with the soft underlayer via the head, whereby the recorded magnetization is lost. As a result, an improvement in recording density due to a reduction in medium noise and an improvement in SNR (signal to noise ratio) can be realized, and moreover the reliability of the medium can be improved.

BRIEF DESCRIPTION OF THE DRAWINGS

FIG. 1 consists of schematic views showing the magnetization of a magnetic recording layer and a soft underlayer of a conventional perpendicular magnetic recording medium, in which

FIG. 3 consists of schematic views showing the magnetization in the perpendicular two-layer magnetic recording medium according to the present invention when writing and when reading, in which

FIG. 4 shows OSA images of samples according to Example 1 and Comparative Examples 1 and 2, in which

FIG. 5 shows Kerr loops for a perpendicular direction for soft underlayer property evaluation samples, in which FIG. 6 shows signal outputs for the perpendicular magnetic recording media of Example 1 and Comparative Examples 1 and 2, in which

DETAILED DESCRIPTION OF THE INVENTION

Figure 1A:
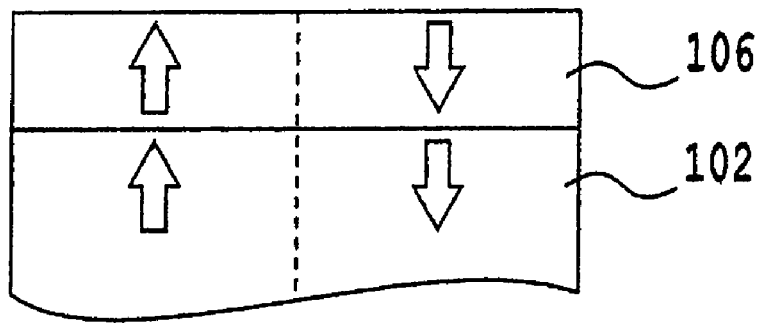
FIG. 1A shows the case of low-density recording and FIG. 1B shows the case of high-density recording.
Figure 1B:
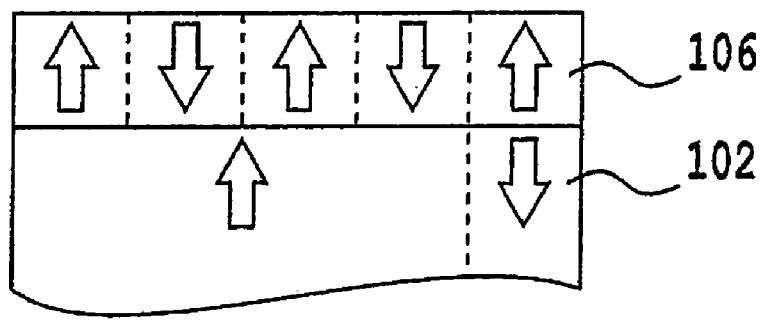
Figure 2:
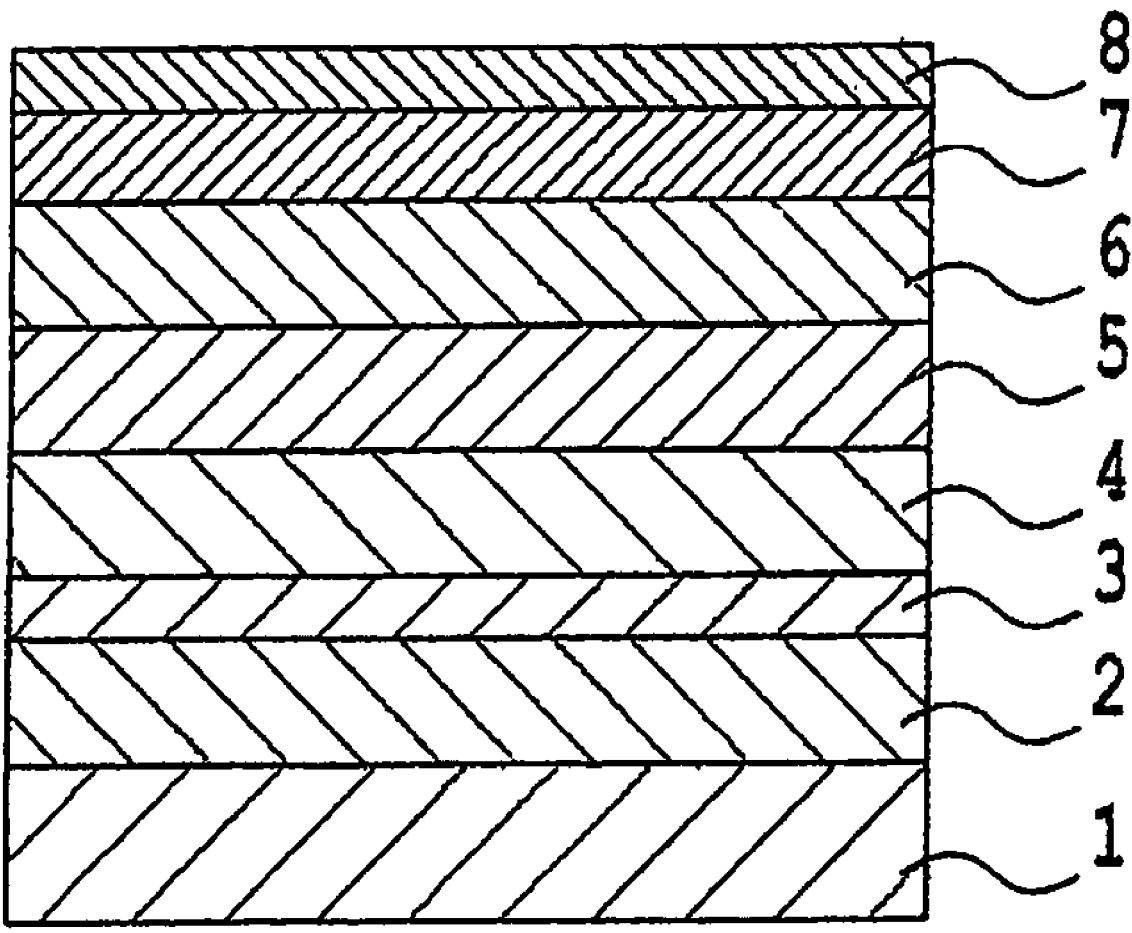
FIG. 2 is a schematic sectional view of a perpendicular two-layer magnetic recording medium according to the present invention.

FIG. 2 is a schematic sectional view of a perpendicular two-layer magnetic recording medium according to the present invention. Here, "perpendicular two-layer magnetic recording medium" means a perpendicular magnetic recording medium having a hard magnetic magnetic recording layer and a soft underlayer. As shown in FIG. 2, the perpendicular two-layer magnetic recording medium according to the present invention has a nonmagnetic substrate 1, and a soft underlayer 2, a nonmagnetic coupling layer 3, a hard magnetic pinning layer 4, a nonmagnetic intermediate layer 5, a magnetic recording layer 6, a protective film 7, and a liquid lubricant layer 8 provided in this order on the nonmagnetic substrate 1. The protective film 7 and the liquid lubricant layer 8 are layers that are optionally provided as desired, but are highly preferably provided in practice. Moreover, a soft magnetic seed layer may be provided between the soft underlayer 2 and the nonmagnetic coupling layer 3 as appropriate.

Any of various substrates having smooth surfaces known in the technical field in question can be used as a nonmagnetic substrate 1. For example, a NiP-plated Al alloy, strengthened glass, crystallized glass or the like as used for magnetic recording media may be used for the nonmagnetic substrate 1.

A crystalline material, such as an FeTaC or Sendust (FeSiAl) alloy, or an amorphous material, such as a Co alloy such as CoZrNb or CoTaZr, can be used as a soft underlayer 2. The optimum value of the thickness of the soft underlayer 2 varies depending on the structure and properties of the magnetic head used in recording, but this thickness is preferably approximately in a range of from 10 to 500 nm in view of productivity.

Moreover, the soft underlayer 2 preferably has uniaxial magnetic anisotropy that is parallel to the surface of the nonmagnetic substrate 1, i.e., the substrate plane, and extends in a radial direction. The uniaxial magnetic anisotropy of the soft underlayer can, for example, be oriented parallel to the surface of the nonmagnetic substrate 1, i.e., the substrate plane, and extend in a radial direction by using a leakage magnetic field from the magnetron when carrying out the film formation using magnetron sputtering (see Japanese Patent Application Laid-open No. 2002-170216). By bestowing such uniaxial magnetic anisotropy, noise produced by the soft underlayer 2 can be further reduced. It is well known that in the case that the magnetization of the soft underlayer 2 has such uniaxial magnetic anisotropy that is parallel to the substrate plane and extends in a radial direction, noise caused by the soft underlayer 2 (SUL noise) is reduced and hence the SNR for the medium is improved (see, for example, Y Nakatani et al., J. Appl. Phys. 93, p. 7744 (2003)). The present invention is no exception, it being possible to reduce SUL noise and thus further improve the SNR for the medium by orienting the magnetic anisotropy of the soft underlayer 2 as above.

In the case of providing a soft magnetic seed layer on the soft underlayer 2, the seed layer may be formed using a permalloy material, I such as NiFeAl, NiFeSi, NiFeNb, NiFeB, NiFeNbB, NiFeMo or NiFeCr, or a material in which Co is further added to a permalloy material, such as CoNiFe, CoNiFeSi, CoNiFeB or CoNiFeNb. The thickness of the soft magnetic seed layer is preferably adjusted such that the magnetic properties and R/W (read/write) performances of the magnetic recording layer 6 are optimum. This thickness generally preferably is approximately in a range of from 3 to 50 nm for balance between medium properties and productivity.

The nonmagnetic coupling layer 3 is a layer for increasing the antiferromagnetic coupling energy between the soft underlayer 2 and the hard magnetic pinning layer 4, so as to facilitate the antiferromagnetic coupling between the soft underlayer 2 and the hard magnetic pinning layer 4, and also for maintaining good crystal orientation of the hard magnetic pinning layer 4, so as to keep the axis of easy magnetization of the material of the hard magnetic pinning layer 4 perpendicular to the surface of the nonmagnetic substrate 1. The nonmagnetic coupling layer 3 may be formed using a metal selected from the group consisting of V, Cr, Cu, Nb, Mo, Ru, Rh, Ta, W, Re and Ir, or an alloy having such a metal as a main component thereof. Moreover, to achieve both of the above two functions of the nonmagnetic coupling layer 3, the thickness of the nonmagnetic coupling layer 3 is preferably not more than 2 nm, and more preferably ranges from 0.4 to 1.2 nm.

From the viewpoint of maintaining good crystal orientation of the hard magnetic pinning layer 4 and suitably orienting the axis of easy magnetization thereof perpendicularly, it is preferable to further do the following. That is, in the case of forming the nonmagnetic coupling layer 3 using V, Cr, Nb, Mo, Ta or W which has a body centered cubic (bcc) structure, it is preferable to make the thickness of the nonmagnetic coupling layer 3 be not more than 1 nm, and more preferably to range from 0.4 to 0.8 nm. This is because, in the case of using a material having a bcc structure, the lower the thickness, the more easily an epitaxial relationship is achieved between the optional seed layer (which has a face centered cubic (fcc) structure) and the hard magnetic pinning layer 4 (which has a hexagonal closest packed (hcp) structure), and hence the easier it is to suitably orient the hard magnetic pinning layer 4 perpendicularly. Moreover, from the viewpoint of obtaining a large antiferromagnetic coupling energy, this thickness is preferably approximately not more than 1 nm. On the other hand, for Cu, Ru, Rh, Re or Ir which has an fcc or hcp structure, if the above thickness is not more than 2 nm, and preferably ranges from 0.4 to 1.2 nm, then good crystal orientation of the hard magnetic pinning layer 4 can be maintained, and the axis of easy magnetization thereof can be suitably oriented perpendicularly.

The hard magnetic pinning layer 4 is a layer for producing antiferromagnetic coupling with the soft underlayer 2 via the nonmagnetic coupling layer 3 in a temperature range of usage of an HDD, generally an ambient temperature, e.g., −20 to 80° C., so as to reduce noise originating from the soft underlayer 2. The hard magnetic pinning layer 4 comprises a material having Co as a main constituent thereof and further containing at least one constituent selected from the group consisting of Cr and Pt, preferably a ferromagnetic material of an alloy comprising at least Co and Pt. Moreover, the material from which the hard magnetic pinning layer 4 is formed must have an hcp structure, where the c axis of the hcp structure is oriented perpendicular to the surface of the nonmagnetic substrate 1, i.e. the axis of easy magnetization is oriented perpendicular to the surface of the nonmagnetic substrate 1. The hard magnetic pinning layer 4 may be a single layer film comprising an alloy material, such as CoPt, CoCrPt, CoCrPtB or CoCrPtTa, or a multilayer laminated film, such as $[Co/Pt]_n$ or $[Co/Pd]_n$. By using such a material, the anisotropy of the hard magnetic pinning layer 4 in the perpendicular direction can be increased, and hence noise caused by the soft underlayer 2 can be effectively reduced.

Alternatively, the hard magnetic pinning layer 4 may be preferably formed using a material having a granular structure in which magnetic crystal grains are dispersed in a nonmagnetic oxide or nonmagnetic nitride matrix. Materials having a granular structure that can be used include $CoPt—SiO_2$, $CoCrPtO$, $CoCrPt—SiO_2$, $CoCrPt—Al_2O_3$, $CoPt—AlN$, and $CoCrPt—Si_3N_4$, although there is no limitation thereto. In the present invention, by using a material having a granular structure, the recording resolution of the hard magnetic pinning layer 4 can be increased, and hence noise produced by the soft underlayer 2 can be yet more effectively reduced. Moreover, a material having a granular structure is also useful in terms of acting as a template for determining the crystal grain size of the materials of the nonmagnetic intermediate layer 5 and the magnetic recording layer 6 formed thereon.

Moreover, from the viewpoint of reducing noise caused by the soft underlayer 2 while suppressing a decrease in writeability, the hard magnetic pinning layer 4 preferably has a thickness of not more than 10 nm, and more preferably ranges from 3 to 8 nm.

Furthermore, the hard magnetic pinning layer 4 preferably has a uniaxial anisotropy constant of not less than $5 \times 10^5$ erg/cm$^3$ ($5 \times 10^4$ J/m$^3$) so that the hard magnetic pinning layer 4 functions effectively. By having such a uniaxial anisotropy constant, the hard magnetic pinning layer 4 can be kept as being hard magnetic, and hence the magnetization can be suitably oriented perpendicular to the surface of the nonmagnetic substrate 1 without being affected by a demagnetization field.

Moreover, the coercivity of the hard magnetic pinning layer 4 is preferably lower than the coercivity of the magnetic recording layer 6 so that the hard magnetic pinning layer functions effectively. By setting the coercivity in this way, the hard magnetic pinning layer 4 fulfils a function of aiding recording to the magnetic recording layer 6, and hence the writeability for the magnetic recording medium of the present invention can be suitably maintained.

The nonmagnetic intermediate layer 5 is a layer for maintaining the magnetic properties and R/W performances of the magnetic recording layer 6. The nonmagnetic intermediate layer 5 may be formed using a metal selected from the group consisting of Ru, Pt, Ir, Re and Rh, or an Ru-based alloy in which Ru is added to one material or a plurality of materials selected from the group consisting of C, Cu, W, Mo, Cr, Ir, Pt, Re, Rh, Ta and V, although there is no limitation thereto. To realize high-density recording, the thickness of the nonmagnetic intermediate layer 5 must be made as low as possible within a range such as to not cause a deterioration in the magnetic properties or RAN performances of the magnetic recording layer 6. Specifically, the nonmagnetic intermediate layer 5 has a thickness which preferably ranges of from 1 to 20 nm.

The magnetic recording layer 6 can be preferably formed using a ferromagnetic material that is an alloy comprising at least Co and Pt. Because the magnetic recording medium of the present invention is used as a perpendicular magnetic recording medium, the axis of easy magnetization of the material of the magnetic recording layer 6, e.g., the c axis of an hcp structure, must be oriented perpendicular to the surface of the nonmagnetic substrate 1. Ferromagnetic materials for forming the magnetic recording layer 6 include alloy materials, such as CoPt, CoCrPt, CoCrPtB and CoCrPtTa. Moreover, a multilayer laminated film such as [Co/Pt]n or [Co/Pd]n may be used as the magnetic recording layer 6.

Alternatively, it is also preferable to form a single layer or multilayer magnetic recording layer 6 using a material having a granular structure in which magnetic crystal grains are dispersed in a nonmagnetic oxide or nonmagnetic nitride matrix. Materials having a granular structure that can be used include CoPt—$SiO_2$, CoCrPtO, CoCrPt—$SiO_2$, CoCrPt—$Al_2O_3$, CoPt—AlN, and CoCrPt—$Si_3N_4$, although there is no limitation thereto. In the present invention, by using a material having a granular structure, the medium properties can be improved, i.e., interaction between neighboring magnetic crystal grains in the magnetic recording layer 6 can be suppressed, noise can be reduced, the SNR can be improved, and the recording resolution can be improved.

The optionally provided protective film 7 is a layer for protecting the constituent layers from the magnetic recording layer 6 downwards; for example, a thin film having carbon as a main component thereof can be used. Other than this, the protective film 7 may be formed using any of various thin film materials known as materials for magnetic recording medium protective films in the technical field in question.

The optionally provided liquid lubricant layer 8 is a layer for lubricating when a writing/reading head contacts the magnetic recording medium, and may be formed, for example, using a perfluoropolyether liquid lubricant or any of various liquid lubricant materials known in the technical field in question.

Each of the layers laminated on the nonmagnetic substrate 1 may be formed using any of various film formation techniques commonly used in the field of magnetic recording media. The layers from the soft underlayer 2 to the protective film 7 may be formed, for example, using a sputtering method including DC magnetron sputtering, RF magnetron sputtering, etc., a vacuum deposition method, or a CVD method. Moreover, the liquid lubricant layer 8 may be formed, for example, using a dipping method or a spin coating method.

Figure 3A:
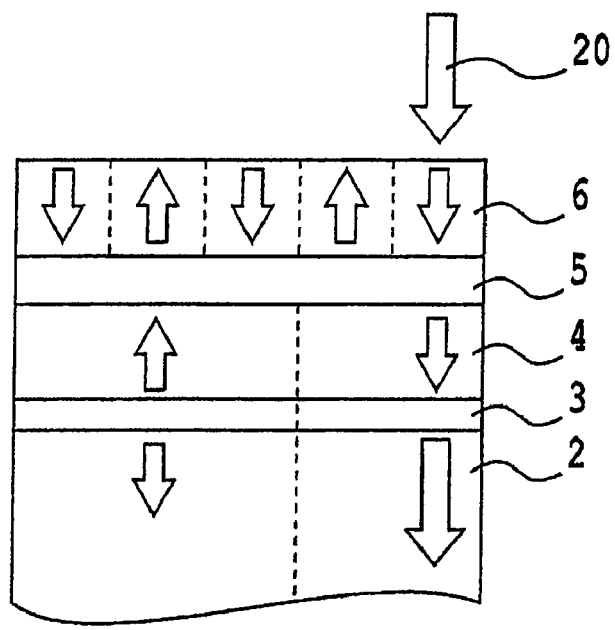
FIG. 3A shows the case of writing.

The behavior of the magnetization of the soft underlayer upon writing and upon reading when using the medium according to the present invention will now be described in more detail. FIG. 3A is a schematic view of the magnetization in the perpendicular two-layer magnetic recording medium according to the present invention when writing. Note that in FIG. 3, for simplicity, the nonmagnetic substrate 1, the protective film 7 and the liquid lubricant layer 8 are omitted. In FIG. 3A, when writing the right-most bit, the magnetization of an upper portion of the soft underlayer 2 is oriented downwards following the head magnetic field 20. At the same time, the magnetization of the hard magnetic pinning layer 4 also follows the head magnetic field 20 due to the head magnetic field 20 being strong. That is, when writing, in a portion where the writing is carried out directly below the head, the magnetizations of the hard magnetic pinning layer 4 and the upper portion of the soft underlayer 2 are oriented in the same direction following the head magnetic field 20, whereby a magnetic circuit required for writing the bit is formed in the magnetic recording layer 6.

Figure 3B:
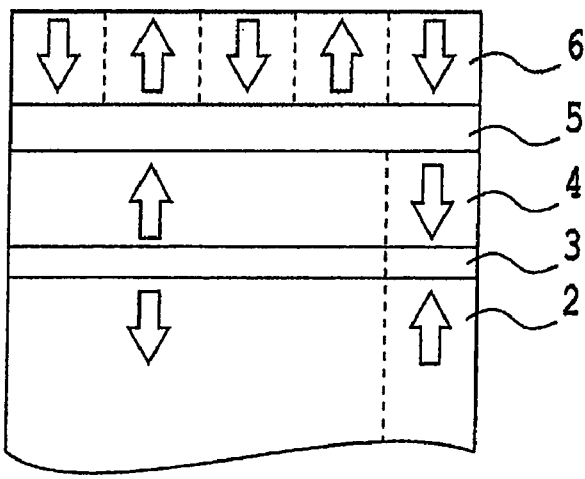
FIG. 3B shows the case of reading.

Next, the behavior of the magnetization upon reading will be described. FIG. 3B is a schematic view of the magnetization in the perpendicular two-layer magnetic recording medium according to the present invention when reading. When reading, the head magnetic field 20 is removed, but the orientation of the magnetization of the hard magnetic pinning layer 4 which has relatively high anisotropy remains as is (the same as the direction of the head magnetic field 20 when writing). Due to antiferromagnetic coupling at ordinary temperature with this magnetization of the hard magnetic pinning layer 4, the magnetization of the upper portion of the soft underlayer 2 which has low anisotropy is oriented opposite to the magnetization of the hard magnetic pinning layer 4, i.e., in a direction opposite to the head magnetic field 20 when writing. Through this mechanism, the magnetizations of the hard magnetic pinning layer 4 and the upper portion of the soft underlayer 2 when reading cancel one another out, and hence the magnetization of the upper portion of the soft underlayer 2 appears to disappear, and thus noise caused by the soft underlayer 2 can be suppressed.

EXAMPLES

Example 1

Using a chemically strengthened glass substrate having a smooth surface (N-5 glass substrate made by HOYA) as a nonmagnetic substrate 1, this was cleaned and then introduced into a DC magnetron sputtering apparatus, and using a Co5Zr8Nb (composed of 5 at % Zr, 8 at % Nb, and the remainder Co based on all atoms; likewise hereinafter) target, a 60 nm-thick CoZrNb amorphous soft underlayer 2 was formed. Next, using an Ru target, a 0.7 nm-thick Ru nonmagnetic coupling layer 3 was formed. Next, using a Co20Cr10Pt4B target, a 6 nm-thick CoCrPtB hard magnetic pinning layer 4 was formed. The formation of the soft underlayer 2, the nonmagnetic coupling layer 3, and the hard magnetic pinning layer 4 was carried out in Ar gas at a pressure of 0.67 Pa. Next, using an Ru target, a 10 nm-thick Ru nonmagnetic intermediate layer 5 was formed in Ar gas at a pressure of 4.0 Pa. Next, a magnetic recording layer 6 having a two-layer granular structure was formed. First, using a 90(Co12Cr16Pt)-10SiO$_2$ target, an 8 nm-thick CoCrPt—SiO$_2$ first magnetic recording layer was formed under a gas pressure of 5.3 Pa, and then using a 96(Co20Cr12Pt)-4SiO$_2$ target, an 8 nm-thick CoCrPt—SiO$_2$ second magnetic recording layer was formed under a gas pressure of 1.2 Pa. Finally, using ethylene as a material gas, a 4 nm-thick C protective film 7 was formed using a plasma CVD method under a gas pressure of approximately 0.13 Pa, and then the laminate thus obtained was removed from the vacuum apparatus. All of the layers from the magnetic recording layer 6 downwards were formed using DC magnetron sputtering. After that, a 2 nm-thick perfluoropolyether liquid lubricant layer 8 was formed using a dipping method, whereby a perpendicular magnetic recording medium was obtained.

Moreover, to evaluate the properties of the soft underlayer 2, a sample was manufactured in which after the layers up to the CoCrPt hard magnetic pinning layer 4 had been formed, the protective film 7 was formed without providing the nonmagnetic intermediate layer 5 and the magnetic recording layer 6.

Example 2

A perpendicular magnetic recording medium was manufactured exactly as in Example 1, except that after the CoZrNb soft underlayer 2 had been formed, a 6 nm-thick NiFeSi soft magnetic seed layer was formed by DC magnetron sputtering using an Ni12Fe4Si target.

Moreover, as in Example 1, a sample having a structure of nonmagnetic substrate 1/soft underlayer 2/nonmagnetic coupling layer 3/hard magnetic pinning layer 4/protective film 7 was manufactured for evaluating the properties of the soft underlayer 2.

Example 3

A perpendicular magnetic recording medium was manufactured by repeating the procedure of Example 1, except that in the formation of the nonmagnetic coupling layer 3, a Cu target was used instead of the Ru target, so as to form a 0.6 nm-thick Cu nonmagnetic coupling layer 3. Moreover, a sample for evaluating the properties of the soft underlayer 2 was manufactured as in Example 1.

Example 4

A perpendicular magnetic recording medium was manufactured by repeating the procedure of Example 1, except that in the formation of the hard magnetic pinning layer 4, a 90(Co14Cr16Pt)-10SiO$_2$ target was used instead of the Co20Cr10Pt4B target, so as to form a 5 nm-thick CoCrPt—SiO$_2$ hard magnetic pinning layer 4 having a granular structure. Moreover, a sample for evaluating the properties of the soft underlayer 2 was manufactured as in Example 1.

Example 5

A perpendicular magnetic recording medium was manufactured by repeating the procedure of Example 1, except that in the formation of the hard magnetic pinning layer 4, a Co20Cr target was used instead of the Co20Cr10Pt4B target, so as to form an 8 nm-thick CoCr hard magnetic pinning layer 4. Moreover, a sample for evaluating the properties of the soft underlayer 2 was manufactured as in Example 1.

Comparative Example 1

A perpendicular magnetic recording medium was manufactured by repeating the procedure of Example 2, except that the nonmagnetic coupling layer 3 and the hard magnetic pinning layer 4 were not formed. Moreover, a sample for evaluating the properties of the soft underlayer 2 was manufactured as in Example 2.

Comparative Example 2

Using a chemically strengthened glass substrate having a smooth surface (N-5 glass substrate made by HOYA) as a nonmagnetic substrate, this was cleaned and then introduced into a DC magnetron sputtering apparatus, and using a Co5Zr8Nb target, a 30 nm-thick first CoZrNb amorphous soft underlayer was formed. Next, using an Ru target, a 0.7 nm-thick Ru layer was formed. Next, using the Co5Zr8Nb target again, a 30 nm-thick second CoZrNb amorphous soft underlayer was formed. Next, using an Ni12Fe4Si target, a 6 nm-thick NiFeSi soft magnetic seed layer was formed. Next, using an Ru target, a 10 nm-thick Ru nonmagnetic intermediate layer was formed in Ar gas at a pressure of 4.0 Pa. After that, a magnetic recording layer, a protective film, and a liquid lubricant layer were formed as in Example 1, whereby a perpendicular magnetic recording medium was manufactured.

Moreover, to evaluate the properties of the soft underlayer, a sample was manufactured in which after the layers up to the second CoZrNb soft underlayer had been formed, the protective film was formed without providing the NiFeSi seed layer, the Ru nonmagnetic intermediate layer, and the magnetic recording layer.

Evaluation

Note that for the perpendicular magnetic recording medium of Examples 1, 3, 4 and 5, the nonmagnetic coupling layer 3 and the hard magnetic pinning layer 4 act like a seed layer, and hence the nonmagnetic intermediate layer 5 and the magnetic recording layer 6 were suitably perpendicularly oriented, i.e., the c axis of the crystals of the hcp structure were oriented perpendicular to the surface of the nonmagnetic substrate 1. On the other hand, with the layer structure of Comparative Examples 1 and 2, a perpendicular orientation of the nonmagnetic intermediate layer and the magnetic recording layer cannot be obtained if a seed layer is not used, and hence an NiFeSi seed layer was used so as to make the structure like that of Example 2.

Figure 4A:
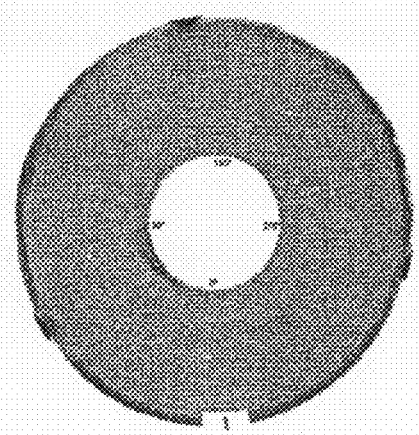
FIG. 4A shows the OSA image of the sample of Example 1.
Figure 4B:
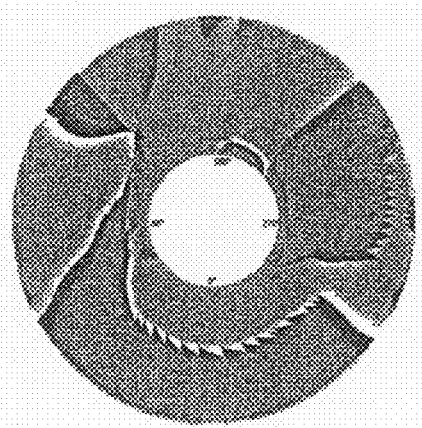
FIG. 4B shows the OSA image of the sample of Comparative Example 1.
Figure 4C:
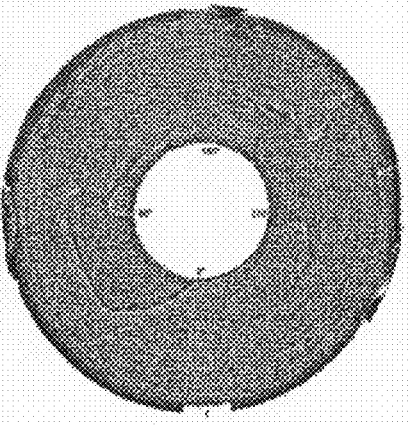
FIG. 4C shows the OSA image of the sample of Comparative Example 2.

For the soft underlayer property evaluation samples obtained in each of the above Examples, the magnetic domain structure was observed using an OSA (Optical Surface Analyzer) made by Candela. OSA images of the media according to Example 1 and Comparative Examples 1 and 2 are shown in FIG. 4. Note that the OSA images for the media of Examples 2 to 5 were just like for the medium of Example 1. The line patterns seen in the images show the magnetic domain structure, magnetic domain walls being present in media for which such a magnetic domain structure is seen. For the medium according to Example 1 shown in FIG. 4A, a magnetic domain structure was not seen at all, whereas for the medium according to Comparative Example 1 shown in FIG. 4B, a clear magnetic domain structure was seen. Moreover, for the medium according to Comparative Example 2 shown in FIG. 4C, a magnetic domain structure was seen, albeit a weak one.

Here, the magnetizations of the first and second soft underlayers in Comparative Example 2 were anti-parallelly coupled together with the 0.7 nm-thick Ru layer sandwiched therebetween. That is, the magnetization of the second CoZrNb soft underlayer was oriented in the substrate plane. This is because the anisotropy constant of the CoZrNb used on this occasion is small relative to the demagnetizing field (approximately $1.4 \times 10^5$ erg/cm$^3$ ($1.4 \times 10^4$ J/m$^3$)). The state of the magnetization of the second CoZrNb soft underlayer in Comparative Example 2 can be interpreted as being equivalent to the case that the magnetization of the hard magnetic pinning layer 4 is oriented in the substrate plane in Examples 1 to 4. However, in this case, the magnetic domain structure cannot be eliminated as is clear from FIG. 4C.

From the above results, it was found that by using the medium structure according to the present invention, a soft underlayer having no magnetic domain walls can be obtained.

Figure 5A:
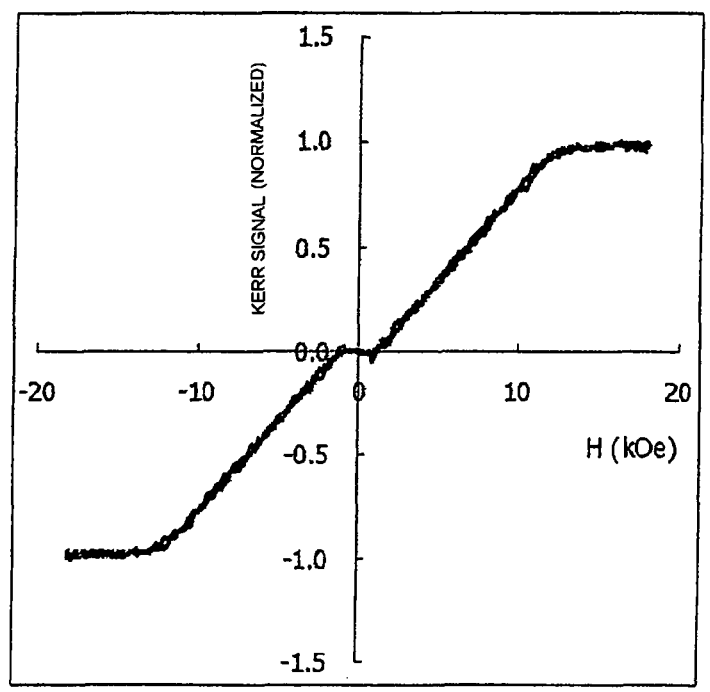
FIG. 5A shows the Kerr loop for the sample of Example 1.
Figure 5B:
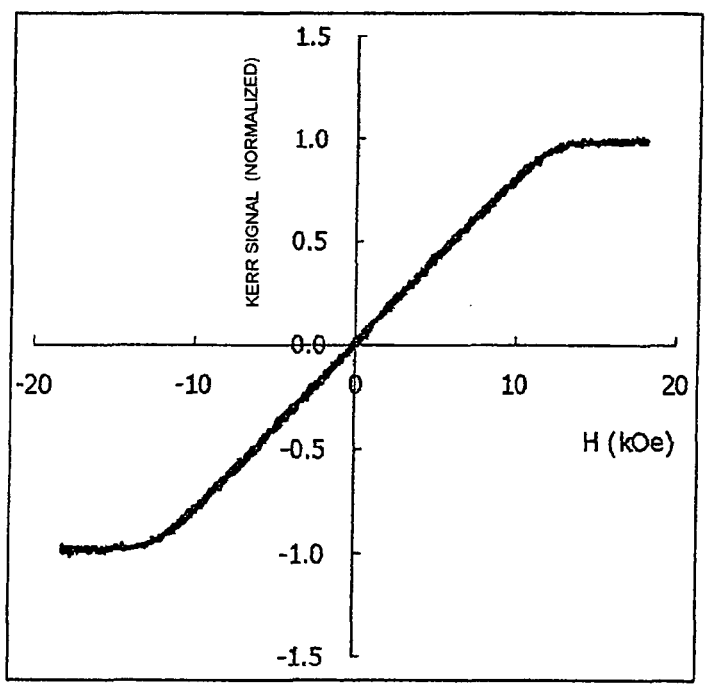
FIG. 5B shows the Kerr loop for the sample of Comparative Example 1.

Next, for the perpendicular magnetic recording medium obtained in each of the Examples, the coercivity $H_c$ was measured using a Kerr effect measurement apparatus. Moreover, for the soft underlayer property evaluation sample obtained in each of the Examples, the Kerr loop for a direction perpendicular to the surface of the nonmagnetic substrate 1 was measured using the Kerr effect measurement apparatus, so as to investigate the state of coupling between the soft underlayer 2 and the hard magnetic pinning layer 4. FIG. 5A shows the Kerr loop for the direction perpendicular to the surface of the nonmagnetic substrate 1 for the medium according to Example 1, and FIG. 5B shows the Kerr loop for the direction perpendicular to the surface of the nonmagnetic substrate 1 for the medium according to Comparative Example 1. In FIG. 5A, it can be seen that there is a region where the magnetization is zero around zero magnetic field strength. On the other hand, for the Kerr loop in FIG. 5B, there is no such region. The existence of such a region indicates that for the medium according to Example 1, the soft underlayer 2 and the hard magnetic pinning layer 4 are antiferromagnetically coupled together via the nonmagnetic coupling layer 3 in a direction perpendicular to the surface of the nonmagnetic substrate 1. For the property evaluation samples obtained in Examples 2 to 5, again a Kerr loop like that for the sample of Example 1 was clearly seen. From the above results, it was confirmed that by adopting the structure according to the present invention, at ordinary temperature the soft underlayer 2 and the hard magnetic pinning layer 4 are antiferromagnetically coupled together in a direction perpendicular to the surface of the nonmagnetic substrate 1.

Furthermore, the R/W performances of the perpendicular magnetic recording media were evaluated using a read/write tester. As the evaluated items, the spike noise, the noise caused by the soft magnetic layer (SUL noise), the pole erasure (PE), the track average signal output (TAA), the signal output-noise ratio (SNR), and the recording resolution (resolution) were used.

The spike noise and the SUL noise were evaluated using the soft underlayer property evaluation samples. For the spike noise, the case where a spike-like signal was clearly seen on the signal background was evaluated as "bad", the case where clear spike noise was not seen but the baseline was thick and weak spike-like noise was evaluated as "fair", and the case where spike noise was not seen was evaluated as "good". Furthermore, the total value over one revolution of the medium of the signal output from the soft underlayer in this case was taken as the numerical value of the SUL noise.

For each of the perpendicular magnetic recording media provided with the nonmagnetic intermediate layer 5 and the magnetic recording layer 6, the PE was evaluated in accordance with the following procedure in a middle diameter of the medium at a rotational speed of 4200 rpm. (1) Band erasure was carried out in a plus direction (DC+) or a minus direction (DC−); (2) a signal of recording density 53 kfci was recorded on a track in the center of the erased band, and the initial track average output (TAA) was measured; (3) the measured track was divided into 128 sectors, and the writing current was turned on and off at the head of each sector; (4) this turning on and off was repeated over 300 revolutions, and then the TAA was measured; (5) the attenuation from the original TAA to the TAA measured in (4) was evaluated as the attenuation ratio (%) based on the initial TAA. The above evaluation was carried out using a head for which PE readily occurs.

Furthermore, the SNR was evaluated using a signal of recording density 510 kfci. Moreover, the recording resolution was measured using signals of recording density 510 kfci and 146 kfci. The recording resolution was evaluated as the ratio (%) of the TAA at 510 kfci to the TAA at 146 kfci. The evaluation results obtained are shown in Table 1.

TABLE 1

R/W performances of perpendicular magnetic recording media

| | Examples | | | | | Comparative Examples | |
|---|---|---|---|---|---|---|---|
| | 1 | 2 | 3 | 4 | 5 | 1 | 2 |
| $H_c$ [Oe] | 4566 | 4600 | 4536 | 4631 | 4511 | 4518 | 4531 |
| [kA/m] | 363.5 | 366.2 | 361.1 | 368.6 | 359.1 | 359.6 | 360.7 |
| Spike noise | good | good | good | good | good | bad | fair |
| SUL noise (V) | 143 | 141 | 146 | 138 | 145 | 198 | 168 |
| TAA-1 *[1] (mV$_{p-p}$) | 8.028 | 7.983 | 8.033 | 7.956 | 8.032 | 9.105 | 8.96 |
| TAA-2 *[2] (mV$_{p-p}$) | 2.195 | 2.186 | 2.196 | 2.172 | 2.199 | 2.344 | 2.268 |
| Recording resolution (%) | 27.3 | 27.4 | 27.3 | 27.3 | 27.4 | 25.7 | 25.3 |
| SNR*[2] (dB) | 9.73 | 10.00 | 9.37 | 10.78 | 9.81 | 6.49 | 8.09 |
| PE (%) | 4.2 | 3.1 | 4.7 | 3.3 | 5.3 | 35 | 6.3 |

*[1] Recording density 146 kfci
*[2] Recording density 510 kfci

Comparing the coercivity $H_c$ values, the perpendicular magnetic recording medium in each of the cases had a value ranging from 358.2 to 366.2 A/mm (4500 to 4600 Oe), i.e., there was no great difference between the media. This shows that there was no great difference in the structure of the magnetic recording layer between the magnetic recording media. It is thus thought that the differences in the R/W performances described below depend mainly on noise caused by the soft underlayer.

Figure 6A:
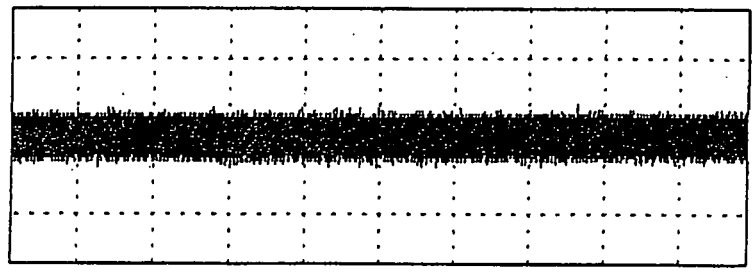
FIG. 6A shows the signal output for the perpendicular magnetic recording medium of Example 1.
Figure 6B:
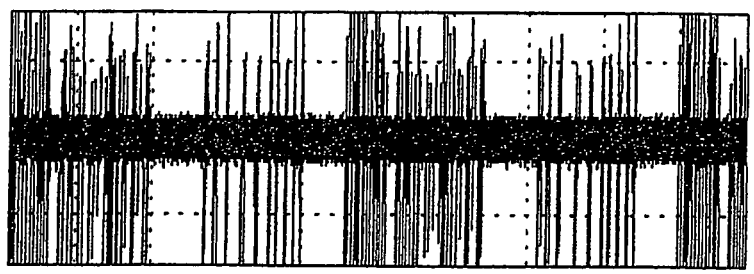
FIG. 6B shows the signal output for the perpendicular magnetic recording medium of Comparative Example 1.
Figure 6C:
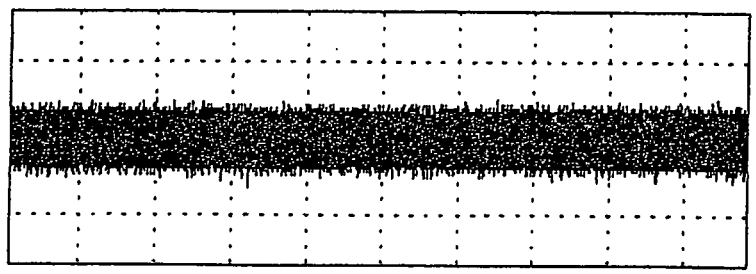
FIG. 6C shows the signal output for the perpendicular magnetic recording medium of Comparative Example 2.

FIG. 6 shows the signal output for the soft underlayer property evaluation sample of each of Example 1, Comparative Example 1 and Comparative Example 2. For the sample of Example 1 shown in FIG. 6A, spike noise was not seen. For the samples of Examples 2, 3 and 4, again spike noise was not seen as for the sample of Example 1 shown in FIG. 6A. On the other hand, for the sample of Comparative Example 1 shown in FIG. 6B, strong spike noise was conspicuous. Furthermore, for the sample of Comparative Example 2 shown in FIG. 6C, clear spike noise was not seen, but the signal output baseline was thick and weak spike-like noise (approximately 1/10 of the output at a recording density of 510 kfci, approximately 0.2 mV) was seen. The above observation results agree qualitatively with the observation results of the magnetic domain structure using an OSA shown in FIG. 4. From the above results, it was found that by using the medium structure according to the present invention, a soft underlayer for which spike noise does not arise can be obtained.

Next, comparing the SUL noise values, it can be seen that, as predicted from the results shown in FIG. 6, the SUL noise for Examples 1 to 5 is lower than the SUL noise for Comparative Examples 1 and 2. From these results, it was found that for the samples according to Examples 1 to 5 having the medium structure according to the present invention, not only can spike noise be suppressed, but moreover noise caused by the soft underlayer can itself be reduced.

Next, let us compare the TAA and SNR values, and also consider the superposition of the output due to the soft underlayer on the signal output of the medium. From Table 1, it can be seen that the SNR for the media of Examples 1 to 5 is approximately 2.9 to 3.5 dB higher than for the medium of Comparative Example 1, and approximately 1.2 to 2 dB higher than for the medium of Comparative Example 2. One cause of the improvement in the SNR is thought to be the reduction in the SUL noise described above. In addition, it is thought that the output due to the soft underlayer also has an effect on the SNR. Let us thus consider the output due to the soft underlayer. Comparing the TAA's at high recording density (510 kfci) and low recording density (146 kfci) and the recording resolution for each of the magnetic recording media shown in Table 1, it can be seen that for the perpendicular magnetic recording media of Examples 1 to 5, the track average signal output at high recording density (TAA-2) is high compared with the track average signal output at low recording density (TAA-1), and the recording resolution is high. It is thought from the coercivity $H_c$ measurements that there is no great difference in the magnetic recording layer 6 itself, and hence these differences are thought to be due to the soft underlayer. It is known that with a perpendicular magnetic recording medium having a soft underlayer, during low-density recording the output from the soft underlayer is superposed on the output from the magnetic recording layer, whereas during high-density recording, because the recording resolution for the soft underlayer is low, the contribution of the output from the soft underlayer is low, and as a result the recording resolution of the perpendicular magnetic recording medium as a whole appears to be low. Considering the above, it is thought that, for the media of Examples 1 to 5, the difference in the signal output and the recording resolution is due to the output due to the soft underlayer being low not only during high-density recording but also during low-density recording.

Next, the PE values were compared. As shown in Table 1, it can be seen that the PE for the perpendicular magnetic recording media according to Examples 1 to 5 and Comparative Example 2 is greatly reduced compared with for the perpendicular magnetic recording medium of Comparative Example 1. In addition, it can be seen that the PE for the perpendicular magnetic recording media of Examples 1 to 5 in which the soft underlayer 2 and the hard magnetic pinning layer 4 are antiferromagnetically coupled together via the nonmagnetic coupling layer 3 in a direction perpendicular to the surface of the nonmagnetic substrate 1 is yet lower than the PE for the perpendicular magnetic recording medium of Comparative Example 2 in which the magnetizations of the two soft underlayers are coupled anti-parallelly in the in-plane direction of the surface of the nonmagnetic substrate 1.

Next, the uniaxial anisotropy constant of the hard magnetic pinning layer 4 was measured for each of Examples 1, 4 and 5. The hard magnetic pinning layers 4 in Examples 1, 4 and 5 had uniaxial anisotropy constants of respectively $1.5 \times 10^6$ erg/cm$^3$ ($1.5 \times 10^5$ J/m$^3$), $3.5 \times 10^6$ erg/cm$^3$ ($3.5 \times 10^5$ J/m$^3$), and $5.0 \times 10^5$ erg/cm$^3$ ($5.0 \times 10^4$ J/m$^3$). From the above investigation, it was ascertained that a hard magnetic pinning layer 4 having a uniaxial anisotropy constant of not less than $5.0 \times 10^5$ erg/cm$^3$ ($5.0 \times 10^4$ J/m$^3$) has a suitable perpendicular orientation, so that noise caused by the soft underlayer can be reduced.

From the above results, it was ascertained that by using the medium structure according to the present invention in which the soft underlayer 2 and the hard magnetic pinning layer 4 are antiferromagnetically coupled together via the nonmagnetic coupling layer 3 in a direction perpendicular to the surface of the nonmagnetic substrate 1, SUL noise, i.e., noise caused by the soft underlayer which is present even in the case that there is no magnetic recording layer, and noise produced through the mirror-image of the magnetic recording layer being transferred to the soft underlayer are suppressed, and hence the SNR for the medium is improved. Moreover, it was found that by using the medium structure according to the present invention, there can be obtained a perpendicular magnetic recording medium for which the resistance to an external magnetic field is high, and erasure due to such an external magnetic field does not occur.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A perpendicular magnetic recording medium, comprising:
    a nonmagnetic substrate having a surface onto which are provided a plurality of layers comprised of, in the order recited,
    a soft underlayer;
    a nonmagnetic coupling layer provided directly on and in contact with the soft underlayer;
    a hard magnetic pinning layer that is provided directly on and in contact with the nonmagnetic coupling layer, that is antiferromagnetically coupled to an upper portion of the soft underlayer at ambient temperature via the nonmagnetic coupling layer and that has an axis of easy magnetization which extends in a direction perpendicular to that of the surface of the nonmagnetic substrate;

a nonmagnetic intermediate layer; and a magnetic recording layer.

2. The perpendicular magnetic recording medium according to claim 1, wherein the soft underlayer additionally has uniaxial magnetic anisotropy that is parallel to the surface of the nonmagnetic substrate and extends in a radial direction.

3. The perpendicular magnetic recording medium according to claim 1, wherein the nonmagnetic coupling layer comprises one of (a) a metal selected from the group consisting of V, Cr, Cu, Nb, Mo, Ru, Rh, Ta, W, Re and Ir, or (b) an alloy having a main constituent selected from the group consisting of V, Cr, Cu, Nb, Mo, Ru, Rh, Ta, W, Re and Ir.

4. The perpendicular magnetic recording medium according to claim 1, wherein the nonmagnetic coupling layer has a thickness which does not exceed 2 nm.

5. The perpendicular magnetic recording medium according to claim 1, wherein the hard magnetic pinning layer comprises a material which has Co as a main constituent thereof and which additionally contains at least one constituent selected from the group consisting of Cr and Pt.

6. The perpendicular magnetic recording medium according to claim 1, wherein the hard magnetic pinning layer comprises a material which has a granular structure in which magnetic crystal grains are dispersed in one of a nonmagnetic oxide matrix or a nonmagnetic nitride matrix.

7. The perpendicular magnetic recording medium according to claims 1, wherein the hard magnetic pinning layer has a thickness which does not exceed 10 nm.

8. The perpendicular magnetic recording medium according to claim 1, wherein the hard magnetic pinning layer has a uniaxial anisotropy constant which is not less than $5\times10^5$ erg/cm$^3$ ($5\times10^4$ J/m$^3$) and a coercivity which is lower than that of the magnetic recording layer.

9. The perpendicular magnetic recording medium according to claim 1, wherein the magnetic recording layer comprises a material which has a granular structure in which magnetic crystal grains are dispersed in one of a nonmagnetic oxide matrix or a nonmagnetic nitride matrix.

10. A perpendicular magnetic recording medium, comprising:

a nonmagnetic substrate having a surface onto which are provided a plurality of layers comprised of, in the order recited, a soft underlayer;

a nonmagnetic coupling layer that is provided directly on and in contact with the soft underlayer, and that is comprised of one of (a) a metal selected from the group consisting of V, Cr, Cu, Nb, Mo, Ru, Rh, Ta, W, Re and Ir, or (b) an alloy having a main constituent selected from the group consisting of V, Cr, Cu, Nb, Mo, Ru, Rh, Ta, W, Re and Ir;

a hard magnetic pinning layer that is provided directly on and in contact with the nonmagnetic coupling layer that is antiferromagnetically coupled to an upper portion of the soft underlayer at ambient temperature via the nonmagnetic coupling layer and that has an axis of easy magnetization which extends in a direction perpendicular to that of the surface of the nonmagnetic substrate;

a nonmagnetic intermediate layer; and a magnetic recording layer wherein the soft underlayer additionally has uniaxial magnetic anisotropy that is parallel to the surface of the nonmagnetic substrate and extends in a radial direction.

11. The perpendicular magnetic recording medium according to claim 10, wherein the hard magnetic pinning layer has a uniaxial anisotropy constant which is not less than $5\times10^5$ erg/cm$^3$ ($5\times10^4$ J/m$^3$) and a coercivity which is lower than that of the magnetic recording layer.

12. The perpendicular magnetic recording medium according to claim 10, wherein the nonmagnetic coupling layer has a thickness which does not exceed 2 nm.

13. The perpendicular magnetic recording medium according to claim 10, wherein the hard magnetic pinning layer comprises a material which has Co as a main constituent thereof and which additionally contains at least one constituent selected from the group consisting of Cr and Pt.

14. The perpendicular magnetic recording medium according to claim 10, wherein the hard magnetic pinning layer comprises a material which has a granular structure in which magnetic crystal grains are dispersed in one of a nonmagnetic oxide matrix or a nonmagnetic nitride matrix.

15. The perpendicular magnetic recording medium according to claims 10, wherein the hard magnetic pinning layer has a thickness which does not exceed 10 nm.

16. The perpendicular magnetic recording medium according to claim 10, wherein the magnetic recording layer comprises a material which has a granular structure in which magnetic crystal grains are dispersed in one of a nonmagnetic oxide matrix or a nonmagnetic nitride matrix.

17. A perpendicular magnetic recording medium, comprising:

a nonmagnetic substrate having a surface onto which are provided a plurality of layers comprised of, in the order recited, a soft underlayer;

a nonmagnetic coupling layer that is provided directly on and in contact with the soft underlayer, and that is comprised of one of (a) a metal selected from the group consisting of V, Cr, Cu, Nb, Mo, Ru, Rh, Ta, W, Re and Ir, or (b) an alloy having as a main constituent a metal selected from the group consisting of V, Cr, Cu, Nb, Mo, Ru, Rh, Ta, W, Re and Ir;

a hard magnetic pinning layer that is provided directly on and in contact with the nonmagnetic coupling layer that has one of (a) Co as a main constituent thereof and at least one constituent selected from the group consisting of Cr and Pt or (b) a granular structure in which magnetic crystal grains are dispersed in one of a nonmagnetic oxide matrix or a nonmagnetic nitride matrix, that is antiferromagnetically coupled to an upper portion of the soft underlayer at ambient temperature via the nonmagnetic coupling layer, and that has an axis of easy magnetization which extends in a direction perpendicular to that of the surface of the nonmagnetic substrate;

a nonmagnetic intermediate layer; and a magnetic recording layer.

18. The perpendicular magnetic recording medium according to claim 17, wherein the soft underlayer additionally has uniaxial magnetic anisotropy that is parallel to the surface of the nonmagnetic substrate and extends in a radial direction.

19. The perpendicular magnetic recording medium according to claim 18, wherein the hard magnetic pinning layer has a uniaxial anisotropy constant which is not less than $5\times10^5$ erg/cm$^3$ ($5\times10^4$ J/m$^3$) and a coercivity which is lower than that of the magnetic recording layer.

20. The perpendicular magnetic recording medium according to claim 18, wherein the magnetic recording layer comprises a material which has a granular structure in which magnetic crystal grains are dispersed in one of a nonmagnetic oxide matrix or a nonmagnetic nitride matrix.

* * * * *